Jan. 12, 1932.  A. W. MELLBERG  1,840,733
AUTOMATIC AIR RELEASE
Filed July 1, 1929  2 Sheets-Sheet 2
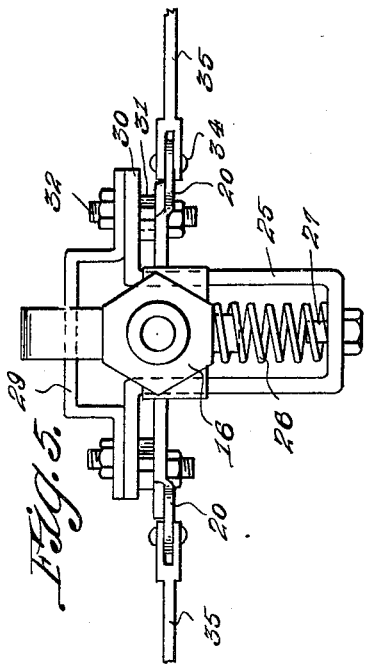
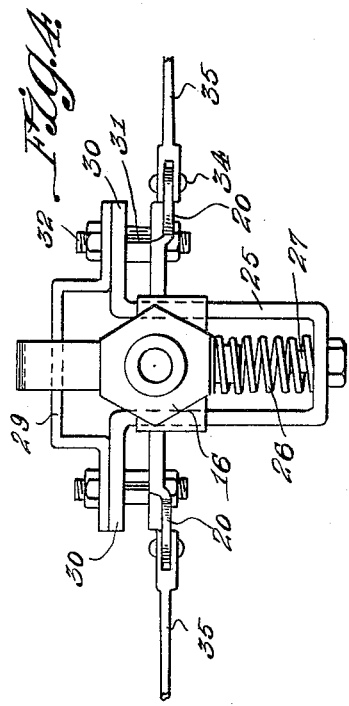
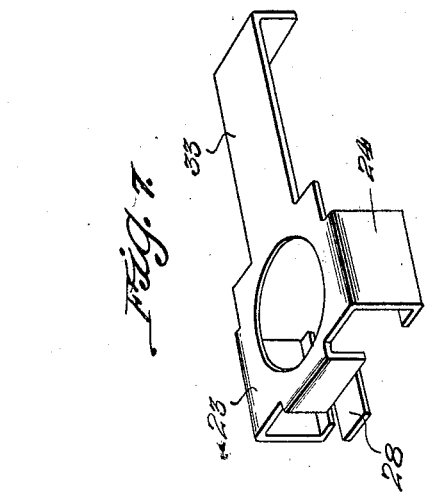
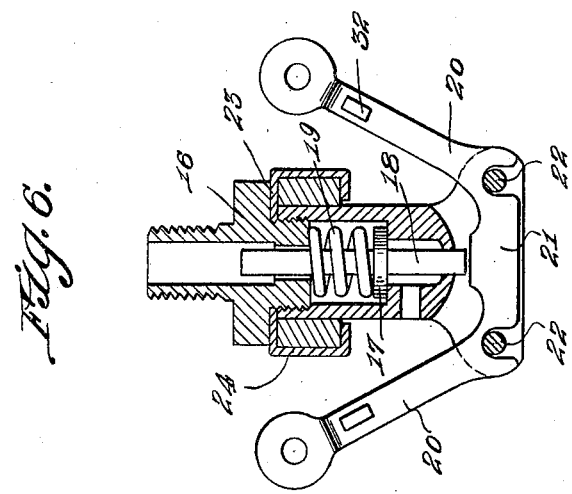
A. W. Mellberg, INVENTOR
BY Victor J. Evans
ATTORNEY Patented Jan. 12, 1932

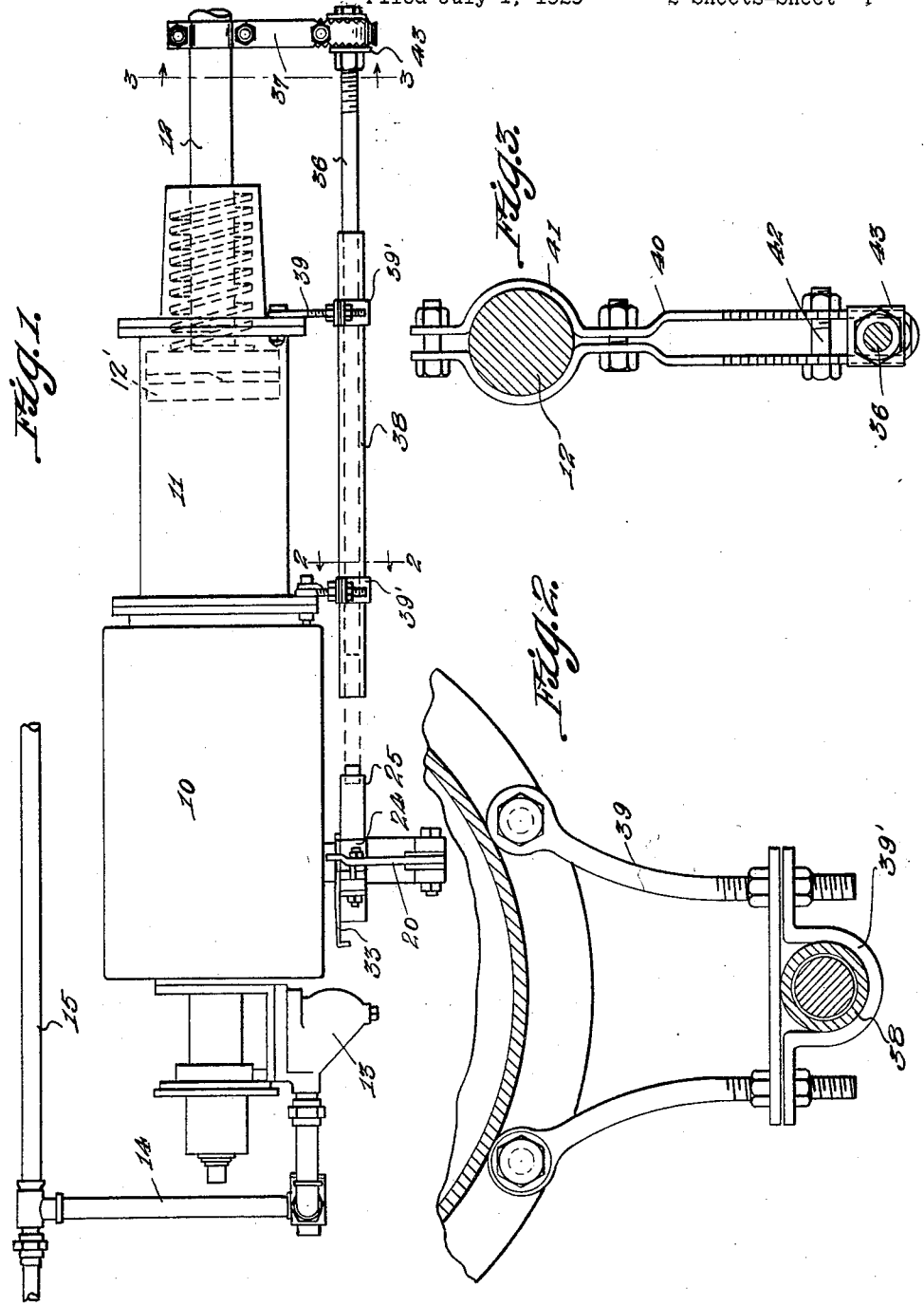

1,840,733

UNITED STATES PATENT OFFICE

ARTHUR WILLIAM MELLBERG, OF NEW ROCKFORD, NORTH DAKOTA, ASSIGNOR OF ONE-HALF TO HARRY P. MILENDER, OF MINOT, NORTH DAKOTA

AUTOMATIC AIR RELEASE

Application filed July 1, 1929. Serial No. 375,225.

This invention relates to improvements in air brake systems and has especial reference to valves for releasing the air from the auxiliary reservoir to release the brakes of a car or train, the invention residing in means for operating the valve.

An object of the present invention is to provide means associated with the release valve whereby the valve may be manually opened and held in open position without the aid of an attendant, until sufficient air is exhausted from the auxiliary reservoir to release the brakes, means being provided for automatically closing the valve subsequent to the release of the brakes, so that the auxiliary reservoir may be again supplied with air pressure without requiring the attendant to close the valve.

With the above and other objects in view, the invention further includes the following novel features and details of construction, to be hereinafter more fully described, illustrated in the accompanying drawings and pointed out in the appended claims.

In the drawings:—

Figure 1 is an elevation showing an auxiliary reservoir and brake cylinder of an air brake system with the invention applied.

Figure 2 is an enlarged fragmentary section taken substantially on the line 2—2 of Figure 1.

Figure 3 is an enlarged sectional view taken substantially on the line 3—3 of Figure 1.

Figure 4 is a top plan view of the release valve and its contiguous parts, the figure showing the parts in the position assumed when the valve is open.

Figure 5 is a similar view with the parts shown in the position occupied when the valve is closed.

Figure 6 is a sectional view of the valve.

Figure 7 is a detail perspective view of the guide plate and the parts carried thereby.

Referring to the drawings in detail wherein like characters of reference denote corresponding parts, the reference character 10 indicates the auxiliary reservoir of an air brake system, the brake cylinder being indicated at 11 and the piston rod at 12 and provided with the piston 12'. The triple valve is indicated at 13, while the reference character 14 indicates the air supply pipe which is connected to the train line, a portion of which is indicated at 15. The air release valve is shown at 16 and this valve and the parts above mentioned may be of the usual or any suitable type.

The valve 16 includes a valve member or disk 17 which is carried by a stem 18 and the latter is actuated against the action of a spring 19 through the medium of oppositely located arms 20. These arms are connected as indicated at 21 and are rocked upon spaced pivot pins 22, so that when either of the arms 20 is moved pivotally, the valve 16 will be opened to permit of the passage of air from the reservoir 10. This operation of the valve 16 is usually effected by means connected with the arms 20, which means extends to within convenient reach of the side of the car which carries the valve. The valve is thus adapted to be operated from the side of the car but must be held in open position until the air from the reservoir 10 is exhausted. This requires considerable time and the present invention overcomes this disadvantage by means of the following described mechanism.

Mounted upon the valve 16 and clamped between the valve sections is a plate 23. This plate carries oppositely located guides 24 which slidingly support a yoke 25. The opposite parallel arms of this yoke slide within guides 24 and the yoke is yieldingly held against sliding movement by a spring 26. This spring has one of its ends mounted upon a stud 27 carried by the yoke and its other end mounted upon a lug 28, which extends from the plate 23. The opposite ends of the yoke are connected by a substantially U-shaped plate 29 which is connected to lateral extensions 30 carried by the yoke. The extensions 30 are provided with stops 31 and these stops are formed by the heads of bolts 32 which serve to connect the plate 29 with the extensions of the yoke. The arms 20 are also provided with stops 32 which are adapted to engage the stops 31 as will be hereinafter explained. The plate 23 is provided with a substantially L-shaped stop arm 33 which is arranged to limit sliding movement of the yoke in one direction.

Pivotally secured to the arms 20 as shown at 34 are the inner ends of actuating arms or rods 35 which extend within convenient reach of the sides of the car.

In order to release the air from the auxiliary reservoir 10 when it is desired to move the car to which the brake mechanism is attached, one of the rods 35 is pulled to rock the arms 20 upon one of the pivots 22. As soon as the arms 20 have been pivotally moved a sufficient distance, the stops 31 will engage behind the stops 32 due to the action of the spring 26, and reverse pivotal movement of the arms 20 will be prevented. The valve 16 is held in open position so that the air will escape from the reservoir 10. As soon as pressure is released from the brake cylinder, the piston rod 20 will move inward. This inward movement of the piston rod will carry with it a rod 36 which is secured to the rod 12 by an arm 37. The rod 36 operates within a guide sleeve 38 which is supported by hanger arms 39. These hanger arms have one of their ends secured to the brake cylinder 11 while their opposite ends have secured thereto clamps 39 which engage the sleeve 38. As the rod 36 moves inward with the movement of the piston rod 12, the inner end of this rod 36 will engage the yoke 25 so as to move the latter against the action of the spring 36 and release the stops 32 from the stops 31. When this release is effected, the arms 20 will be moved pivotally under the influence of the spring 19 of the valve 16, so that the valve will be again closed and the auxiliary reservoir in condition to receive air pressure.

The arm 37 is shown in detail in Figure 3 of the drawings and consists of spaced straps 40 having one of their ends clamped around the piston rod 12 as shown at 41, while their opposite ends are clamped around the rod 36 by means of the bolt 42. The opposite edges of the straps 40 are toothed or serrated and are engaged by washers 43 which are adjustably mounted upon the rod 36.

It will be apparent from the foregoing description and accompanying drawings that the valve 16 may be manually opened through the medium of either of the rods 35 and will remain in open position until air is exhausted from the reservoir 10. When this is accomplished, the valve 16 will be automatically closed, so that the only manual operation necessary is to open the valve.

The invention is susceptible of various changes in its form, proportions and minor details of construction and the right is herein reserved to make such changes as properly fall within the scope of the appended claims.

Having described the invention what is claimed is:—

1. An automatic air release comprising a plate mounted on the bleed valve of an air brake system, a substantially U-shaped yoke slidably mounted on the plate, laterally extending arms on the ends of said yoke, stops on said arms, tension means between the plate and yoke to position the stops to engage an operating means on the bleed valve to hold the latter in an open position when opened by the operating means, and means actuated by the brake mechanism of the brake system to release the stops from the operating means of the bleed valve.

2. An automatic air release comprising a plate mounted on the bleed valve of an air brake system, guides carried by the plate, a substantially U-shaped yoke slidable in the guides, laterally extending arms on the yoke, stops on said arms, tension means between the plate and yoke to position the stops to engage an operating means of the bleed valve to hold the latter in an open position when opened by the operating means, a bracket connecting the arms, and a stop arm on the plate to engage the bracket to limit the movement of the yoke.

In testimony whereof I affix my signature.
ARTHUR WILLIAM MELLBERG.